(12) United States Patent
Ma et al.

(10) Patent No.: US 12,078,251 B2
(45) Date of Patent: Sep. 3, 2024

(54) PRESSURE MAINTAINING GAS CYLINDER VALVE

(71) Applicant: DANYANG FEILUN GAS VALVE CO., LTD., Danyang (CN)

(72) Inventors: Zhengyun Ma, Danyang (CN); Haowei Gong, Danyang (CN); Weiguo Lu, Danyang (CN)

(73) Assignee: DANYANG FEILUN GAS VALVE CO., LTD., Danyang (CN)

( * ) Notice: Subject to any disclaimer, the term of this patent is extended or adjusted under 35 U.S.C. 154(b) by 0 days.

(21) Appl. No.: 18/188,791

(22) Filed: Mar. 23, 2023

(65) Prior Publication Data

US 2023/0220915 A1      Jul. 13, 2023

Related U.S. Application Data

(63) Continuation of application No. PCT/CN2022/094614, filed on May 24, 2022.

(30) Foreign Application Priority Data

Jul. 5, 2021   (CN) .......................... 202121515899.2

(51) Int. Cl.
*F16K 1/30*      (2006.01)
*F16K 1/42*      (2006.01)
*F17C 13/04*     (2006.01)

(52) U.S. Cl.
CPC .............. *F16K 1/305* (2013.01); *F16K 1/307* (2013.01); *F16K 1/422* (2013.01); *F17C 13/04* (2013.01); *F17C 2205/0329* (2013.01)

(58) Field of Classification Search
CPC .......... F16K 1/305; F16K 1/307; F16K 1/422; F17C 13/04; F17C 2205/0329

(Continued)

(56) References Cited

U.S. PATENT DOCUMENTS 3,384,133 A * 5/1968 Gordon ................... F16K 1/307
                                                    137/613
4,402,340 A * 9/1983 Lockwood, Jr. ........ F16K 1/305
                                                    251/210

(Continued)

FOREIGN PATENT DOCUMENTS

CN            1078027 A        11/1993
CN          202834234 U         3/2013
(Continued)

OTHER PUBLICATIONS

Translation of CN210440587U retrieved from espacenet.com on Mar. 8, 2024. (Year: 2024).*

(Continued)

*Primary Examiner* — Jessica Cahill
(74) *Attorney, Agent, or Firm* — Jeenam Park (57) ABSTRACT

The invention relates to a pressure maintaining gas cylinder valve. It consists of a pressure retaining device: The axis of the pressure retaining device and that of the valve element are in the same vertical plane; the pressure retaining device has a mounting base, a spring and a valve are located in the mounting base: the valve is in the valve element near the air outlet; the front section of the valve is near the air outlet, while the rear section of the valve is in the mounting base; the spring is between the valve and the mounting base. Because the invention has no eccentricity, the gas channel is smoother and the volume of the cylinder valve is greatly reduced. The mounting seat of the pressure retaining device not only provides support for the valve and spring, but also ensures that the stroke of the valve element is not interfered.

14 Claims, 7 Drawing Sheets

(58) Field of Classification Search
USPC .......................................................... 251/318
See application file for complete search history.

(56) References Cited

U.S. PATENT DOCUMENTS

| | | | | |
|---|---|---|---|---|
| 4,782,861 | A * | 11/1988 | Ross ........................ | F17C 13/04 |
| | | | | 137/505.38 |
| 2003/0150496 | A1* | 8/2003 | Rousselin ................ | F16K 1/305 |
| | | | | 137/613 |
| 2003/0150497 | A1* | 8/2003 | Rousselin ................ | F16K 1/307 |
| | | | | 137/613 |
| 2006/0011883 | A1* | 1/2006 | Martin ..................... | F16K 1/305 |
| | | | | 251/331 |
| 2007/0101864 | A1* | 5/2007 | Nakanoya ................ | F17C 13/06 |
| | | | | 96/108 |
| 2020/0173609 | A1* | 6/2020 | Stephan ................... | F17C 13/04 |

FOREIGN PATENT DOCUMENTS

| | | |
|---|---|---|
| CN | 207378494 U | 5/2018 |
| CN | 209494938 U | 10/2019 |
| CN | 210440587 U | 1/2020 |
| CN | 210716169 U | 6/2020 |
| CN | 212718066 U | 3/2021 |
| CN | 214946629 U | 11/2021 |
| EP | 2003379 A | 12/2008 |
| IT | 942153 | 4/1996 |

OTHER PUBLICATIONS

Translation of CN210716169U retrieved from espacenet.com on Mar. 8, 2024. (Year: 2024).*

* cited by examiner

PRESSURE MAINTAINING GAS CYLINDER VALVE

CROSS-REFERENCE TO RELATED APPLICATIONS

The present application is a U. S. continuation of co-pending International Patent Application No. PCT/CN2022/094614 filed May 24, 2022, which claims foreign priority of Chinese Patent Application No. 202121515899.2, filed on Jul. 5, 2021 in the State Intellectual Property Office of China, the contents of all of which are hereby incorporated by reference.

TECHNICAL FIELD

The invention relates to the technology of gas valve, especially relates to a pressure maintaining gas cylinder valve.

BACKGROUND

The gas cylinder valve is a valve installed on the gas cylinder to control the gas on-off and flow. During the use of ordinary cylinder valves, air is easy to enter the gas cylinder when the gas in the cylinder is used up, therefore, the gas cylinder must be subject to the vacuum treatment before the cylinder is filled with the high-purity gas, which results in the increase of production costs. Therefore, the cylinder valve is improved with the existing technology and many cylinder valves are provided with the pressure retention function. In this way, when the pressure in the gas cylinder is lower than the set pressure during the deflation process of the gas cylinder, the cylinder valve can automatically close to prevent the gas in the cylinder from being completely used up, thus ensuring the purity of the gas in the cylinder.

There are generally two mounting methods for the pressure retaining device in the existing cylinder valve with pressure retaining function: One is to hollow out the center of the valve element and install the pressure retaining device in the valve element; such method is characterized in more difficult manufacturing process and resulting higher manufacturing costs; the other is to install the pressure retaining device on one side of the valve element, in this way, because the axis of the pressure retaining device and that of the valve element are located in two vertical planes, the volume and weight of the cylinder valve become larger, thus resulting in higher manufacturing costs.

SUMMARY

In order to solve the problems existing in the pressure maintaining gas cylinder valve, the invention provides a pressure maintaining gas cylinder valve which can reduce the volume of the cylinder valve and save the manufacturing costs.

The technical scheme of the invention is described as follows:

A pressure maintaining gas cylinder valve, consisting of following components: a valve body: The valve body described here is provided with an air inlet, an air outlet, a valve cavity and a gas channel connecting the air inlet and the air outlet; the gas channel described here can run through the valve cavity; a valve element and a valve element control mechanism: The valve element described is located in the valve cavity and driven by the valve element control mechanism to move in the valve cavity to realize the opening/closing of the air inlet; the pressure retaining device is set up in the gas channel described; the axis of the pressure retaining device described and that of the valve element are in the same vertical plane; the pressure retaining device described has a mounting base which is laterally arranged on the gas channel near the air outlet; the other end of the gas channel is sealed by a plug; a spring and a valve are located in the mounting base described: The valve described is located in the valve element near the air outlet; the front section of the valve is near the air outlet for opening/closing the air outlet, while the rear section of the valve is located in the mounting base and can move laterally along the mounting base; the spring described is located between the valve and the mounting base for pushing the valve to close the air outlet.

The pressure retaining device of the invention shall be equipped with mounting base that can provide support and moving space for valve and spring. The invention introduces the mounting base with two different structures:

One is that: the mounting base described is designed into a cylinder and the cavity of the cylinder is used to accommodate the spring and the valve which can move laterally in the cavity; the rear end of the cylinder described is closed and fixed on the gas channel near the air outlet through the snap ring. On the wall of the cylinder described, there are a number of gas vents extending along the axial direction of the cylinder and running through the cylinder for gas circulation. Such mounting base is completely located on one side of the valve element and fixed on the valve body through a snap ring, and there is no intersection between mounting base and valve element, therefore, the mounting base does not block the travel of the valve element. At the same time, the gas vents are set up on the cylinder body to realize the gas circulation at the front and back sides of the cylinder.

The other is that: the mounting base is designed to a cylinder, and the front section of the cylinder is provided with a transverse cavity for accommodating the spring and the valve for lateral movement of the valve; the rear section of the cylinder is provided with a longitudinal through hole for the element to pass through and achieve longitudinal movement. The outer wall of the front section of the described cylinder is provided with a groove extending along the axis of the cylinder for gas circulation. The upper and lower sides of the rear section of the cylinder are flat, which is convenient for gas circulation. There is a stepped face between the rear section and the front section of the mounting base; besides, the matched stepped face shall be set up in the corresponding position of the valve body described for the positioning and installation of the mounting base. There is a bump in the rear end of the mounting base for inserting a plug to fix the mounting base. Considering that the snap ring is inconvenient to be installed and not fixed firmly, the invention introduces the second structure, that is, no snap ring is adopted and the mounting base extends to the valve element so that the support and fixation of the mounting base can be realized by use of the valve wall of the valve body; however, in order to avoid affecting the stroke of the valve element, a through-hole is set up on the mounting base for the valve element to pass through so that the valve element can normally move up and down. For the second structure, the step surface is set on the valve body and the mounting base to realize the rapid installation, positioning and fixation of the mounting base.

In order to further reduce the volume of the pressure retaining device, we can consider extending the spring into the valve to avoid the increase in the length of the mounting base caused by the long spring; the specific scheme is that a hole is opened in the rear section of the described valve so that one end of the described spring is inserted into the hole in the rear section of the valve and connected with the valve, the other end of the spring is connected with the rear wall of the cavity of the mounting base. At the same time, the balancing hole is set up in the front section center of the valve and connected with the hole in the rear section of the valve.

Preferred scheme: The first valve seat is set up in the bottom of the valve cavity for closing the air inlet in coordination with the valve element; and/or the second valve seat is located on one side of the air outlet near the gas channel for closing the air outlet in coordination with the valve.

Preferred scheme: The front section of the valve is designed to a cone which is compatible with the second valve seat; the front section of the valve is surrounded by the first seal ring and the rear section of the valve is surrounded by the second seal ring to realize the sealing between the valve and the mounting base.

Besides, the described valve element control mechanism consists of a valve stem and a hand wheel; the valve stem and the valve element are located in the valve cavity; one end of the valve stem is connected with the valve element for transmission, while the other end is fixedly connected with the hand wheel so that the valve element is driven by the hand wheel to move up and down through rotating the hand wheel.

Compared with the existing technologies, the invention has the following advantages:

The axis of the pressure retaining device described in the invention and that of the valve element are in the same vertical plane without eccentricity, thus the gas channel is smoother and the volume of the cylinder valve is greatly reduced, which saves the manufacturing costs.

In the pressure retaining device described in the invention, the valve with small volume is completely located on one side of the valve element and moves on one side of the valve element horizontally, therefore, there is no intersection between valve and valve element and it does not affect the vertical movement of the valve element.

The mounting base of the pressure retaining device described in the invention not only can provide support for valve and spring but also can ensure that the stroke of valve element shall be not intervened.

The front section of the valve in this invention is designed to a cone; it can extend into the air outlet and fit with the second valve seat to achieve closer contact. At the same time, it works with the seal ring to achieve a better sealing effect of the valve.

The cross-sectional dimensions of the front and rear sections of the valve described in the invention are different. Therefore, the thrust forces of the gas applied on the two sections are different during gas release so that the valve can overcome the elastic force of the spring to move to the right and then disconnects from the air outlet to realize the discharge of the gas.

The figures above illustrate the following parts: 1. Valve element control mechanism; 10. Hand wheel; 11. Valve stem; 12. Pressing cap; 2. Valve body; 20. Transverse part of valve body; 21. Second valve seat; 22. Gas channel; 23. Longitudinal part of valve body; 24. First valve seat; 25. Plug; 26. Valve element; 261. Countersunk hole; 27. Valve cavity; 3. Gas cylinder interface; 31. Air inlet; 4. Equipment interface; 41. Air outlet; 5. Pressure retaining device; 51. First seal ring; 52. Valve; 53. Cylinder body, 54. Gas vent; 55. Spring; 56. Snap ring; 57. Transverse cavity; 58. Second seal ring; 59. Balance hole; 6. Pressure retaining device; 60. Cylinder, 601. Bump; 602. Through hole; 603. Transverse cavity; 604. Front section of the cylinder; 605. Rear section of the Rear section of the cylinder; 606. Groove; 61. Valve; 62. Spring; 63. First seal ring; 64. Balance hole; 65. Second seal ring; 66. Stepped face.

DETAILED DESCRIPTION

We will give a specific description of the enforcement mode for the invention in the attached drawings and embodiments.

Embodiment 1

Figure 1:
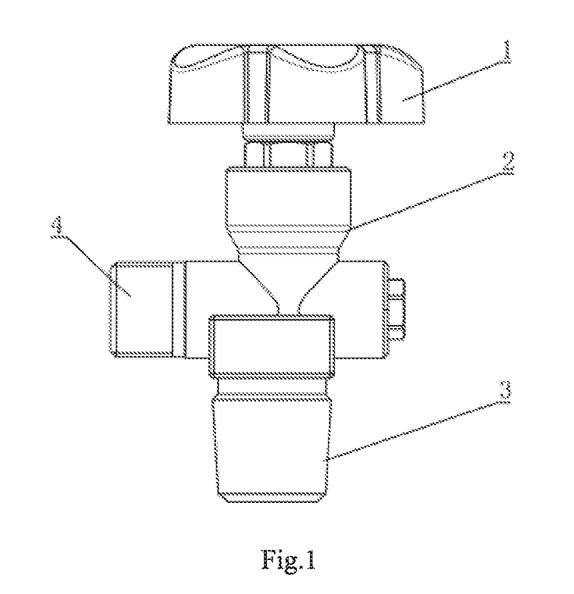
FIG. 1 shows the Front View of Embodiment 1.
Figure 2:
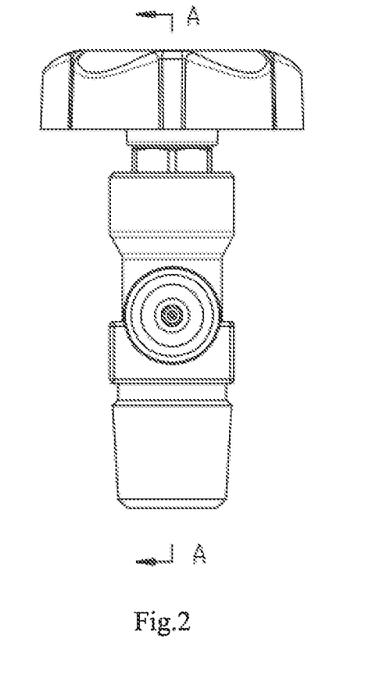
FIG. 2 shows the Left View of Embodiment 1.
Figure 3:
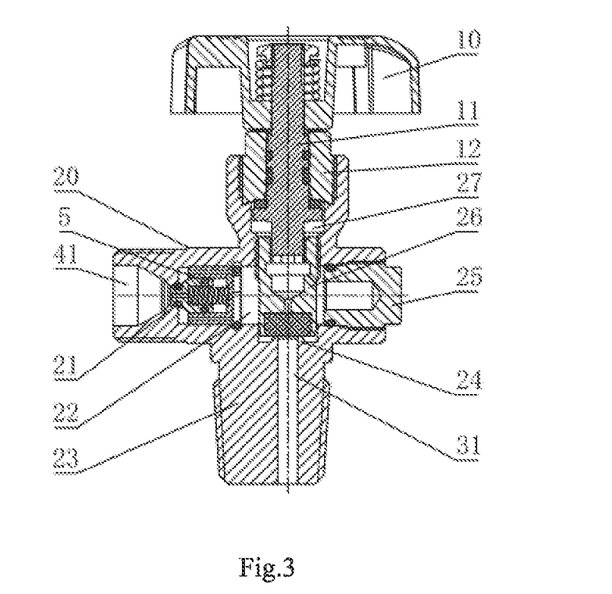
FIG. 3 shows the Section View A-A of FIG. 2.
Figure 4:
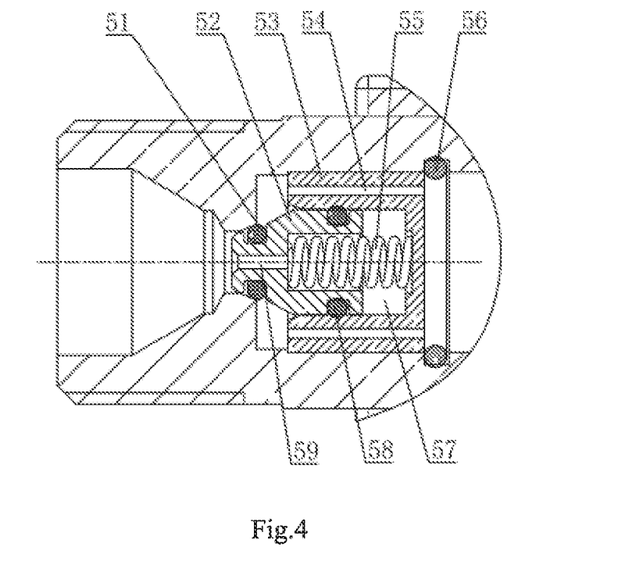
FIG. 4 shows the Schematic Diagram of Pressure Retaining Device in Closing State in Embodiment 1.
Figure 5:
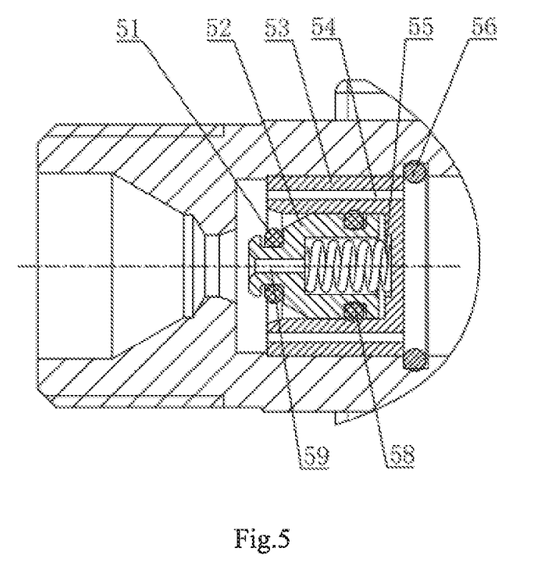
FIG. 5 shows the Schematic Diagram of Pressure Retaining Device in Open State in Embodiment 1.
Figure 6:
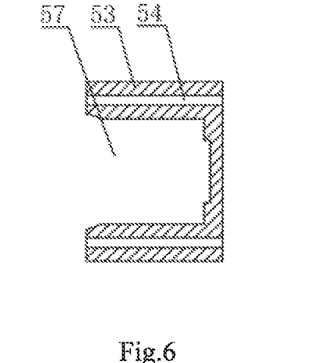
FIG. 6 shows the Section View of Mounting Base in Embodiment 1.

FIG. 1-6 show the structure of the pressure maintaining gas cylinder valve described in Embodiment 1 of the invention, wherein FIGS. 1 and 2 show the external structure of the gas cylinder valve, FIG. 3 shows the Section View A-A of Gas Cylinder Valve, and FIGS. 4 and 5 show the Partial Section View of Pressure Retaining Device under Condition of Gas Cylinder Valve in Closed and Open States, illustrating the internal structure of the gas cylinder valve.

As shown in FIGS. 1 and 2, the pressure maintaining gas cylinder valve consists of Valve Body 2 which is presented as a cross shape between transverse part and longitudinal part of the valve body; the axis of Transverse Part 20 and Longitudinal Part 23 of the valve body are located in the same vertical plane. The tapered Cylinder Interface 3 is located in the bottom of Longitudinal Part 23 for connecting the cylinder. Handle Wheel 10 is set up at the top of Longitudinal Part 23 for controlling the opening and closing of the valve. Device Interface 4 for connecting external gas or aeration equipment is located on the left side of the Transverse Part 20 of the valve body.

FIG. 3 shows the internal structure of the cylinder valve. Gas Channel 22 is set up in Valve Body 2 described for gas circulation; Valve Cavity 27 is located in the longitudinal part 23 of the valve body; Gas Channel 22 crosses Valve Cavity 27 and is connected with Air Inlet 31 in the gas cylinder interface and Air Outlet 41 in the equipment interface. Valve Element 26 is located in Valve Cavity 27; the cyclic bump integrated into the valve body at the bottom of the valve cavity serves as the first valve seat 24 which works with the valve element to realize the opening or closing of the air inlet. Valve Element 26 is driven by the valve element control mechanism 1 above it to move along the longitudinal axis of the valve body to realize the opening or closing of the valve. Specifically, the valve element control mechanism 1 consists of Hand Wheel 10, Valve Stem 11 and Pressing Cap 12; Square Hole 261 is opened at the top of Valve Element 26 and square head is set up at the bottom end of Valve Stem 11 to fit the square hole for the transmission connection between valve stem and valve element. The external thread outside the top of Valve Element 26 matches with the internal thread of the valve cavity for threaded connection between valve element and valve cavity. The top of Valve Stem 11 is fixed with Hand Wheel 10, and Pressing Cap 12 is set up between Hand Wheel 10 and Valve Body 2 for cup joint with Valve Stem 11 to achieve the fixation and sealing of the valve element control mechanism. Because the positions of the hand wheel and the valve stem are fixed, when the hand wheel is turned, it will drive the valve element to move up and down along the axis so as to control the valve element to move up and down through the positive and negative rotation of the hand wheel, thus opening or closing the valve.

The left side of Gas Channel 22 is connected with Air Outlet 41, and the integrated internal conical surface of the air outlet near one end of the gas channel serves as the second valve seat 21; the right side of Gas Channel 22 is sealed by Plug 25. Pressure Retaining Device 5 is installed in Gas Channel 22 on the left side of the valve element. As shown in FIG. 4, Pressure Retaining Device 5 described is provided with a mounting base which is a cylinder 53; the described Cylinder 53 is transversely installed in Gas Channel 22 and the outside diameter of Cylinder 53 matches the diameter of the gas channel. The rear end of Cylinder 53 is closed and fixed on the side wall of the gas channel through Snap Ring 56. Cylinder 53 is provided with a transverse cavity 57 and a valve 52 and a spring 55 are installed in the transverse cavity. The front and rear sections of Valve 52 described are conical and cylindrical, respectively. The rear section of Valve 52 is inserted into Cylinder 53 and the outer diameter of the valve matches the inner diameter of the cylinder; the second seal ring 58 is installed between Cylinder 53 and the rear section of Valve 52. The front section of Valve 52 fits the Second valve seat 21 and the first seal ring 51 is embedded in the outer wall to meet air tightness requirements when the air outlet is closed. In order to save space, a hole shall be made in the rear section of the valve so that one end of the spring extends into the hole of the valve and contacts with the valve, and the other end contacts with the back wall of the transverse cavity. When the pressure difference applied on the valve is below a certain value, the valve can be pushed by the spring to contact the second valve seat to close the air outlet. A balance hole 59 connecting with gas channel and cylinder cavity is located in the front section center of Valve 52. On the cylinder wall of Cylinder 53, there are several gas vent 54 extending along the axial direction of the cylinder body and through the front and back of the cylinder body to connect the gas channels in the front and back of the cylinder.

This example is used as follows:

When the cylinder valve is deflated, the hand wheel is rotated counterclockwise to drive the valve element to rise and separate from the valve seat, then the air inlet is connected with the gas channel and the high-pressure gas in the gas cylinder enters the gas channel. Because the cross-sectional dimensions of the front and rear sections of the valve are different, the thrust of the gas on the valve toward the right is greater than the thrust of the spring on the valve toward the left. Therefore, the valve is retracted to the cylinder body and the front section of the valve is separated from the second valve seat; the gas channel is connected with the air outlet and the gas is discharged from the air outlet. When the pressure in the cylinder drops to the set accommodating pressure, the spring force is greater than the thrust of the gas on the valve, then the valve is pushed toward the air outlet. The first seal ring of the valve fits the second valve seat and the air passage is automatically closed. The low-pressure gas in the cylinder will be kept in the cylinder to prevent the gas in the cylinder from being completely used up, which may cause the air to flow into the cylinder.

When filling the gas cylinder valve with gas, use a special gas-charging adapter with an ejector pin to connect the gas-charging connector of the air source with the equipment interface. The ejector pin can push the valve back so that the front section of the valve is separated from the second valve seat to open the air outlet and fill the gas cylinder with gas.

Embodiment 2

Figure 7:
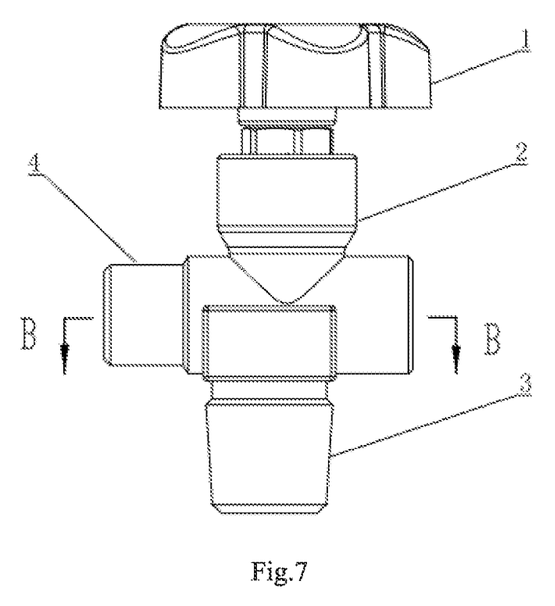
FIG. 7 shows the Front View of Embodiment 2.
Figure 8:
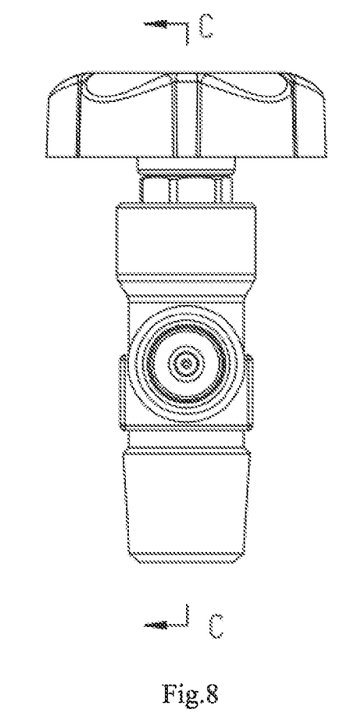
FIG. 8 shows the Left View of Embodiment 2.
Figure 9:
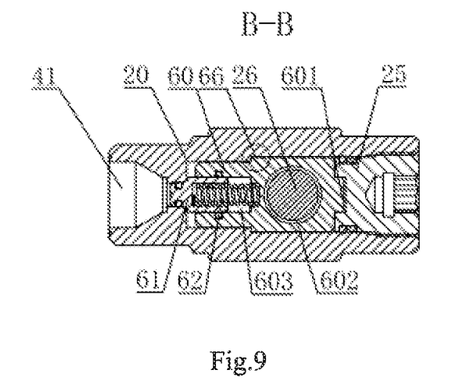
FIG. 9 shows the Section View B-B of FIG. 7.
Figure 10:
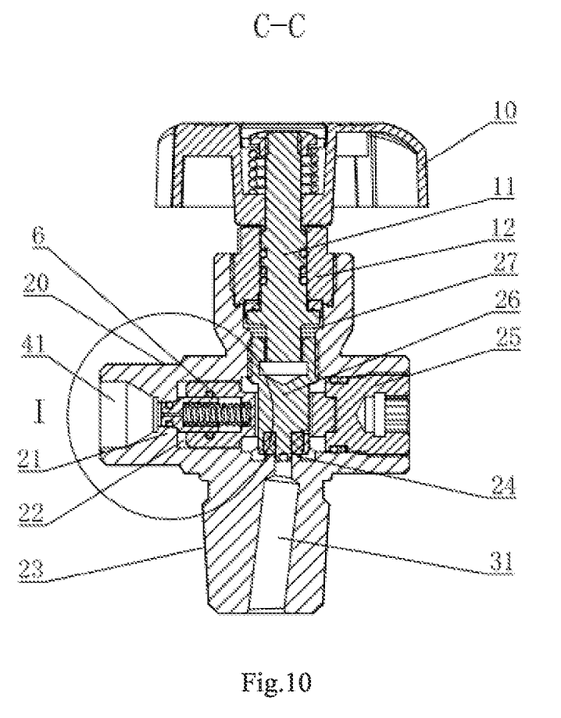
FIG. 10 shows the Section View C-C of FIG. 8.
Figure 11:
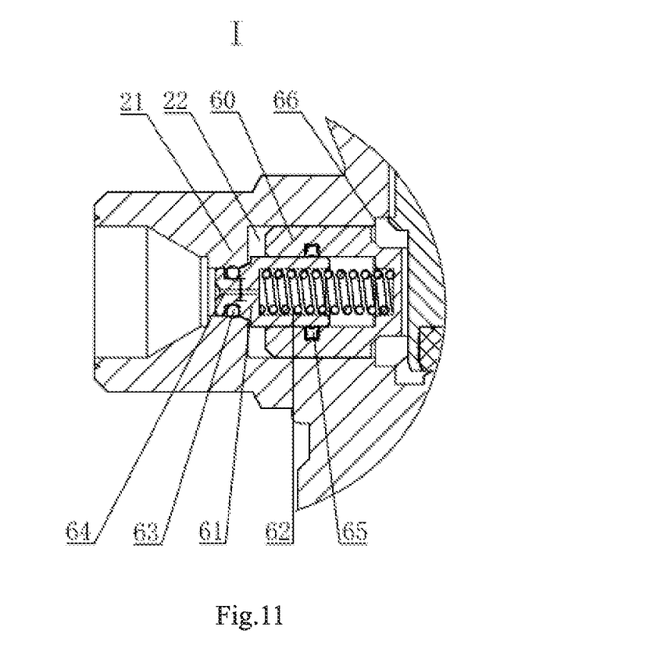
FIG. 11 shows the Drawing of Part I Partial Enlargement in FIG. 10.
Figure 12:
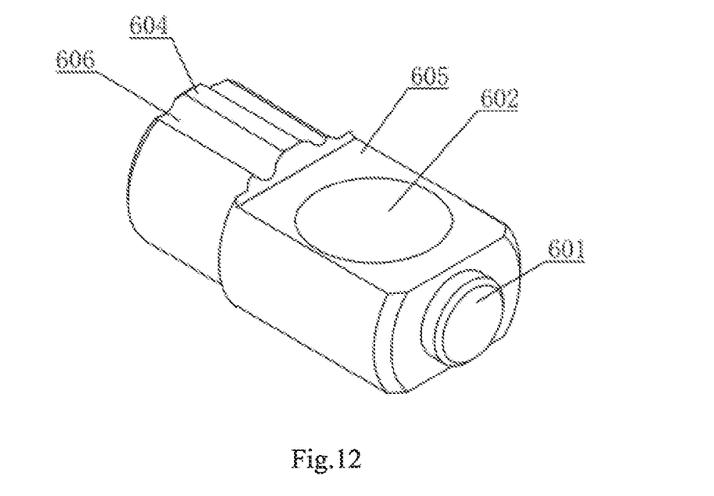
FIG. 12 shows the Elevation of Mounting Base in Embodiment 2.
Figure 13:
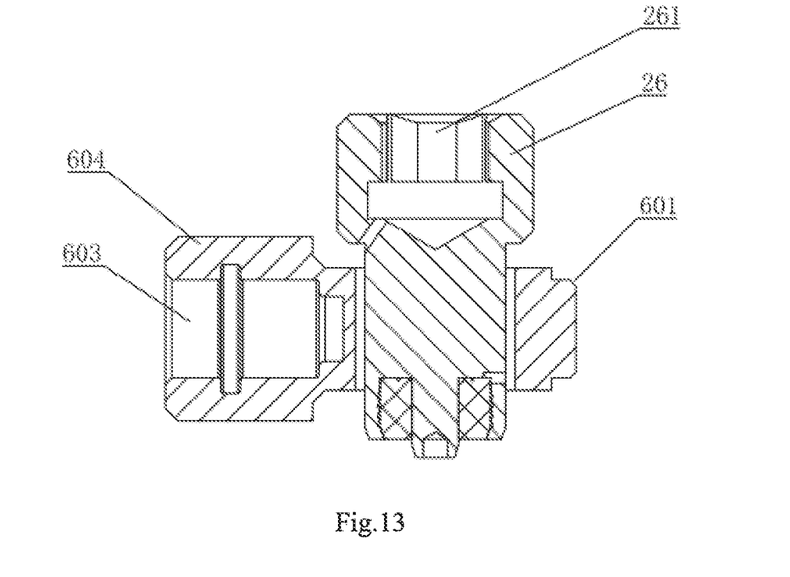
FIG. 13 shows the Section View of Mounting Base and Valve Element in Connection State in Embodiment 2.

FIG. 7-13 show the structure of the pressure maintaining gas cylinder valve described in Embodiment 2 of the invention, wherein FIGS. 7 and 8 show the external structure of the gas cylinder valve, and FIG. 9-11 show the internal structure of the gas cylinder valve in forms of section views in different angles; FIGS. 12 and 13 illustrate the structure of the mounting base described in Embodiment 2.

As shown in FIGS. 7 and 8, the pressure maintaining gas cylinder valve consists of Valve Body 2 which is presented as a cross shape between transverse part and longitudinal part of the valve body; the axis of Transverse Part 20 and Longitudinal Part 23 of the valve body are located in the same vertical plane. The tapered Cylinder Interface 3 is located in the bottom of Longitudinal Part 23 for connecting the cylinder. Handle Wheel 10 is set up at the top of Longitudinal Part 23 for controlling the opening and closing of the valve. Device Interface 4 for connecting external gas or aeration equipment is located on the left side of the Transverse Part 20 of the valve body.

FIG. 9 shows the internal structure of the cylinder valve. Gas Channel 22 is set up in the horizontal part 20 of valve body described for gas circulation; Valve Cavity 27 is located in the longitudinal part 23 of the valve body; Gas Channel 22 crosses Valve Cavity 27 and is connected with Air Inlet 31 in the gas cylinder interface and Air Outlet 41 in the equipment interface. Valve Element 26 is located in Valve Cavity 27; the cyclic bump integrated into the valve body at the bottom of the valve cavity serves as the first valve seat 24 which works with the valve element to realize the opening or closing of the air inlet. Valve Element 26 is driven by the valve element control mechanism 1 above it to move along the longitudinal axis of the valve body to realize the opening or closing of the valve. Specifically, the valve element control mechanism 1 consists of Hand Wheel 10, Valve Stem 11 and Pressing Cap 12; Square Hole 261 is opened at the top of Valve Element 26 and square head is set up at the bottom end of Valve Stem 11 to fit the square hole for the transmission connection between valve stem and valve element. The external thread outside the top of Valve Element 26 matches with the internal thread of the valve cavity for threaded connection between valve element and valve cavity. The top of Valve Stem 11 is fixed with Hand Wheel 10, and Pressing Cap 12 is set up between Hand Wheel 10 and Valve Body 2 for cup joint with Valve Stem 11 to achieve the fixation and sealing of the valve element control mechanism. Because the positions of the hand wheel and the valve stem are fixed, when the hand wheel is turned, it will drive the valve element to move up and down along the axis so as to control the valve element to move up and down through the positive and negative rotation of the hand wheel, thus opening or closing the valve.

The left side of Gas Channel 22 is connected with Air Outlet 41, and the integrated internal conical surface of the air outlet near one end of the gas channel serves as the second valve seat 21; the right side of Gas Channel 22 is sealed by Plug 25. Pressure Retaining Device 6 is installed in the gas channel on the left side of the valve element.

As shown in FIGS. 9 and 11, the pressure retaining device described is provided with a mounting base, a valve 61 and a spring 62; the mounting base described is a cylinder 60; the described Cylinder 60 is installed in the gas channel and is approximately cylindrical. Front section of the cylinder 604 is provided with a transverse cavity 603 for accommodating valve and spring. The outer profile of Front section of the cylinder 604 adapts to the gas channel. The front and rear sections of Valve 61 described are conical and cylindrical, respectively. The rear section of Valve 61 is inserted into the transverse cavity 603 in the front section of the cylinder and the outer diameter of the rear section of the valve 61 matches the inner diameter of the transverse cavity 603; the second seal ring 65 is installed between the rear section of the valve and the side wall of the transverse cavity so that the valve can slide in the transverse cavity. The front section of the valve fits the second seat 21 of the air outlet close to one end of the gas channel and the first seal ring 63 is set up to meet air tightness requirements. The outer wall of the front section of the cylinder 604 is provided with a groove 606 extending along the axis of the cylinder for gas circulation. The diameter of rear section of the cylinder 605 is larger than that of front section of the cylinder 604 and there is a stepped face at the joint of both, meanwhile, the matched stepped face shall be set up in the corresponding position of the valve body for positioning the mounting base; after the mounting base is inserted from the right of gas channel, two stepped faces fit and then the plug is inserted for sealing to realize the accurate positioning of the mounting base and fast and easy installation. The two sides of the rear section of the cylinder 605 are plane and the rear section of the cylinder is larger in size and provided with the longitudinal through hole 602 to insert the valve element and guarantee the valve element moving up and down. Bump 601 is set up in the rear section of the rear section of the cylinder 605 and inserted into the plug on the right of the gas channel to fix the cylinder. A balance hole 64 is located in the front section center of Valve 61. In the rear section of Valve 61, a hole extending along the axial direction for inserting snap ring; one end of Snap Ring 62 contacts with the rear section of Valve 61 and the other end contacts with the rear wall of the transverse cavity 603 to push the valve to move and then close the air outlet.

The use process of the embodiment is the same as Embodiment 1 and will not be described again.

What is claimed is:

1. A pressure maintaining gas cylinder valve, comprising:
   a valve body, wherein the valve body is provided with an air inlet, an air outlet, a valve cavity and a gas channel connecting the air inlet and the air outlet; the gas channel runs through the valve cavity;
   a valve element and a valve element control mechanism, wherein the valve element is located in the valve cavity and driven by the valve element control mechanism to move in the valve cavity so as to open or close the air inlet;
   a pressure retaining device provided in the gas channel;
   wherein, an axis of the pressure retaining device and that of the valve element are in the same vertical plane;
   the pressure retaining device has a mounting base which is laterally arranged on the gas channel near the air outlet; the other end of the gas channel is sealed by a plug;
   a spring and a valve are located in the mounting base, a front section of the valve is near the air outlet to open or close the air outlet, while a rear section of the valve is located in the mounting base and moves laterally along the mounting base; the spring is located between the valve and the mounting base to push the valve to close the air outlet;
   wherein the mounting base is a cylinder, a front section of the cylinder is provided with a transverse cavity for accommodating the spring and the valve for lateral movement of the valve; a rear section of the cylinder is provided with a longitudinal through hole for the valve element to pass through and achieve longitudinal movement.

2. The pressure maintaining gas cylinder valve as claimed in claim 1, wherein a rear end of the cylinder is closed and fixed on the gas channel near the air outlet through a snap ring.

3. The pressure maintaining gas cylinder valve as claimed in claim 2, wherein a wall of the cylinder is provided with a plurality of gas vents extending along an axial direction of the cylinder and running through the cylinder for gas circulation.

4. The pressure maintaining gas cylinder valve as claimed in claim 2, wherein one end of the spring is inserted into a hole in the rear section of the valve to be connected with the valve and the other end is connected with a rear wall of the cavity of the mounting base.

5. The pressure maintaining gas cylinder valve as claimed in claim 4, wherein there is a balance hole in a center of the front section of the valve and the balance hole is connected with the hole in the rear section of the valve.

6. The pressure maintaining gas cylinder valve as claimed in claim 1, wherein an outer wall of the front section of the cylinder is provided with a groove extending along an axial direction of the cylinder for gas circulation.

7. The pressure maintaining gas cylinder valve as claimed in claim 1, wherein upper and lower sides of the rear section of the cylinder are flat, which is convenient for gas circulation.

8. The pressure maintaining gas cylinder valve as claimed in claim 1, wherein there is a stepped face between a rear section and a front section of the mounting base; the stepped face is provided in a corresponding position of the valve body so as to position and install the mounting base.

9. The pressure maintaining gas cylinder valve as claimed in claim 1, wherein there is a bump in the rear section of the cylinder for inserting the plug to fix the mounting base.

10. The pressure maintaining gas cylinder valve as claimed in claim 1, wherein one end of the spring is inserted into a hole in the rear section of the valve to be connected with the valve and the other end is connected with a rear wall of the cavity of the mounting base.

11. The pressure maintaining gas cylinder valve as claimed in claim 1, wherein a first valve seat is provided in a bottom of the valve cavity for closing the air inlet in coordination with the valve element; and/or a second valve seat is located on one side of the air outlet near the gas channel for closing the air outlet in coordination with the valve.

12. The pressure maintaining gas cylinder valve as claimed in claim 11, wherein the front section of the valve is a cone which is compatible with the second valve seat; the front section of the valve is surrounded by a first seal ring and the rear section of the valve is surrounded by a second seal ring to realize a sealing between the valve and the mounting base.

13. The pressure maintaining gas cylinder valve as claimed in claim 1, wherein the valve element control mechanism consists of a valve stem and a hand wheel; the valve stem and the valve element are located in the valve cavity; one end of the valve stem is connected with the valve element for transmission, while the other end is fixedly connected with the hand wheel so that the valve element is driven by the hand wheel to move up and down through rotating the hand wheel.

14. The pressure maintaining gas cylinder valve as claimed in claim 13, wherein a top of the valve cavity is provided with a pressing cap matching the valve stem.

\* \* \* \* \*